United States Patent
Siraky et al.

(10) Patent No.: US 8,461,827 B2
(45) Date of Patent: Jun. 11, 2013

(54) ROLLER BEARING ARRANGEMENT WITH A SENSOR UNIT

(75) Inventors: Josef Siraky, Donaueschingen (DE); Dirk Schmidt, Suhl (DE); Jörg Kegeler, Schleusingen (DE)

(73) Assignees: SICK Stegmann GmbH, Donaueschingen (DE); Schaeffler Technologies GmbH & Co. KG, Herzogenaurach (DE); INA Drivers & Mechatronics GmbH & Co. OHG, Suhl (DE)

( * ) Notice: Subject to any disclaimer, the term of this patent is extended or adjusted under 35 U.S.C. 154(b) by 326 days.

(21) Appl. No.: 12/946,128

(22) Filed: Nov. 15, 2010

(65) Prior Publication Data

US 2011/0116733 A1    May 19, 2011

(30) Foreign Application Priority Data

Nov. 16, 2009  (DE) .................. 10 2009 044 542

(51) Int. Cl.
*G01P 3/48* (2006.01)
*B60B 27/02* (2006.01)

(52) U.S. Cl.
USPC .......................................... 324/166; 384/448

(58) Field of Classification Search
USPC .......... 324/762.01–762.1; 73/114.28; 33/706, 33/708; 384/448
See application file for complete search history.

(56) References Cited

U.S. PATENT DOCUMENTS 3,722,296 A * 3/1973 Hurlburt et al. .................. 74/5 F
4,092,579 A   5/1978 Weit
4,259,637 A   3/1981 Bloomfield et al.
4,429,307 A   1/1984 Fortescue
4,879,552 A   11/1989 Arai et al.
5,409,316 A * 4/1995 Ferguson ....................... 384/447
5,678,933 A   10/1997 Ouchi et al.
2004/0252032 A1 12/2004 Netzer
2005/0092108 A1  5/2005 Andermo

FOREIGN PATENT DOCUMENTS

DE   37 11 062 A1   10/1988
DE   41 34 354 A1   4/1993
DE   42 15 701 C1   7/1993

OTHER PUBLICATIONS

Examination Report issued May 26, 2010, in priority German Application No. 10 2009 044 542.0, two (2) pages.
Fabian, et al., "A Robust Capacitive Angular Speed Sensor," IEEE Transactions on Instrumentation and Measurement, (Feb. 1998), pp. 280-284, vol. 47, No. 1.
Brasseur, "A Robust Capacitive Angular Position Sensor," IEEE Instrumentation and Measurement Technology Conference, Brussels, Belgium, (Jun. 1996), pp. 1081-1086.

* cited by examiner

*Primary Examiner* — Tung X Nguyen
(74) *Attorney, Agent, or Firm* — Nath, Goldberg & Meyer; Jerald L. Meyer

(57) ABSTRACT

The invention relates to a roller bearing (01), with a revolving bearing component (05) and a stationary bearing component (04), and with a capacitive sensor unit (02). The capacitive sensor unit (04) comprises a pivoted sensor element (08), which is connected to the revolving bearing component (05), and a stationary sensor element (09). The sensor units (08, 09) form a capacitor. At least one of the sensor elements (08, 09) bears a first material measure (14, 16), so that a change arises in the capacitance of the capacitor when there is a relative motion in the sensor areas (08, 09). The sensor unit also includes a means for generating a periodic electrostatic field between the sensor plates, and a processing and amplifying electronics unit for evaluating the change in capacitance.

10 Claims, 2 Drawing Sheets

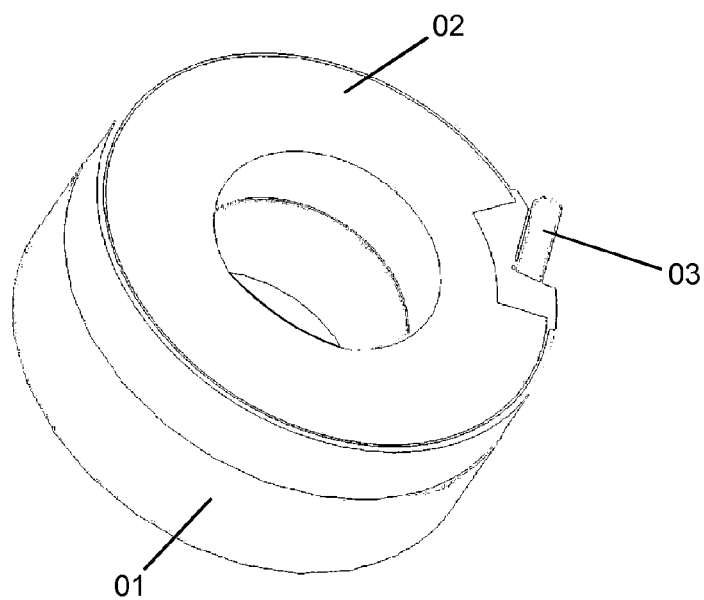
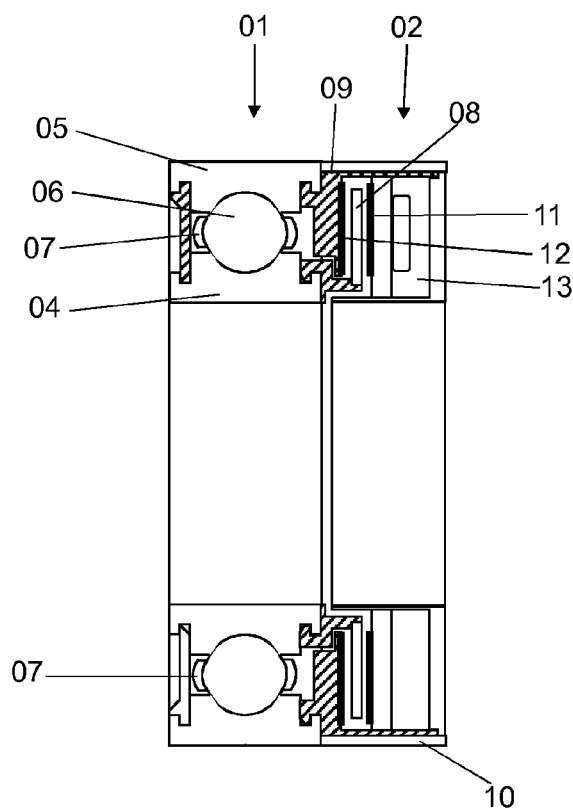
Fig. 1
Fig. 2

ROLLER BEARING ARRANGEMENT WITH A SENSOR UNIT

CROSS-REFERENCE TO RELATED APPLICATION

This is application claims priority under 35 U.S.C. §119, from German patent Application No. 102009044542.0, filed Nov. 16, 2009.

TECHNICAL FIELD

The invention relates to a roller bearing arrangement with a capacitive sensor unit for measuring the angular position and/or rotational speed of a rotating bearing part.

DESCRIPTION OF THE RELATED ART

Both sensors for measuring the angular position and rotational speed of objects, and roller bearing arrangements containing such sensors, are well known to the prior art. The known sensors employ magnetoresistive, optical, or inductive systems.

For example, it is known from EP 0395 783 A1 that components already present in the roller bearing (e.g., the cage) are used as the medium for an even number of discrete magnetic fields of changing polarity. The rotation of these components is converted into an electrical signal by one or several Hall-effect sensors that are mounted on an already present stationary component (a bearing ring at rest.)

Known from DE 101 05 824 A1 is a roller bearing which makes it possible to measure the rotating angle of the two bearing rings. The bearing described comprises a rotating-angle sensor with a measuring range greater than 360°. The sensor arrangement comprises an initial scale, which is positioned on the cage of the roller bearing, and a second scale, which is connected to the inner or outer ring in a torque-proof manner. The scales are optically coded and are scanned by an optical scanner. The system is extremely vulnerable to dirt and contamination.

DE 197 48 996 C1 also deals with a ball bearing with an integrated sensor. The sensor serves to record relative movement between the bearing rings. To this end, there is provided an at least partially formed magnet wheel 5, which is connected to the revolving bearing component. In addition, a sensor serves to scan the magnet wheel. The magnet wheel is made by preference of a magnetizable material and is furnished with magnetic markings that are scanned by a magnetoresistive sensor.

It is also known to identify state functions of a roller bearing by means of accelerometers, which record and evaluate the structure-borne sound of the roller bearing in motion. The evaluation serves principally to identify damage to the roller bearing.

Also known to the prior art are capacitive proximity switches which, e.g., serve the purpose of monitoring or which permit the speed or angle of rotation to be measured. Here a change in the dielectric between the capacitor plates causes a change in capacitance, which is evaluated accordingly. To obtain usable results with this method (rpm measurement), the capacitive sensor must have relatively large surfaces.

Known from DE 600 16 395 T2 are improved devices and processes for the capacitive measurement of the position of moving objects. Here a stationary object and a moving object are positioned in an electrostatic field. One of the elements bears an electrically active pattern, which modulates the electrostatic field between the elements when the moving element rotates. The changes in the field are evaluated accordingly.

SUMMARY

The invention is based on the problem of creating a roller bearing with a sensor unit which has a simple and magnetically insensitive design and which is highly resistant to environmental influences and contamination.

The problem is solved by a roller bearing arrangement with the features of patent claim 1.

Advantageous elaborations of the invention are indicated in the secondary claims.

The roller bearing arrangement according to the invention comprises a rotating and a stationary bearing component, as well as a capacitive sensor unit. The sensor unit contains an initial, movably mounted sensor element (rotor), which is connected to the revolving bearing component; it also contains at least one secondary sensor element (stator), which is electrically conductive and stationary. The capacitive sensor unit is so designed that upon rotation the rotor causes a local change in the dielectric. The rotor itself is a component of the dielectric.

The sensor unit also comprises a means for generating an electrostatic field, preferably a periodic one, which is applied to the capacitor.

By preference, the stator and rotor are designed in accordance with the capacitive displacement sensor described in DE 600 16 395 T2. To that extent, the cited document is expressly incorporated into the disclosed subject matter of the present patent applications, so that a detailed description of the stator and rotor, as well as their interaction, can be omitted here.

By way of example, the stator may consist of two plates or disks, with the rotor positioned between them. The two plates thereby form the capacitor, and the rotor forms the dielectric of the capacitor (together with the intermediate layers of air).

However, it is also possible for the stator to consist of only a single element, which is positioned opposite the rotor. Here the two capacitor plates are positioned on the single stator element, while the rotor bears a coupling plate which conducts the electrical field. One of the two capacitor plates formed on the stator has a plurality of segments distributed over its circumference. One of these capacitor plates operates as a transmitter of the electrical field; the other operates as a receiver. If the transmitter is divided into segments, the electrostatic field is generated by a phase-shifted input of alternating current into the individual segments of the transmitter. Given a knowledge of the input field, the sine and cosine of the rotor's angle of rotation can be determined from the power output of the capacitor when the receiver is divided into segments.

The two sensor elements can rotate in relation to each other. One of the two sensor elements, preferably the rotor, bears a material measure, which brings about a change in the capacitance of the capacitor, or a modulation in the electrostatic field, when there is a relative movement between the sensor elements. The material measure can be realized with the geometric configuration of the sensor element or, e.g., with a conductive layer having a corresponding pattern.

The sensor unit also includes a processing or amplifying electronics unit used to evaluate the change in capacitance.

The specific advantages provided by the invention rest in the fact that the bearing arrangement, with its integrated sensor unit, has a particularly simple design, is inexpensive to produce, and is highly resistant to environmental influences and contamination.

In numerous applications, separate angular measuring systems can be advantageously omitted, which results in a reduction in spatial requirements, expense, and assembly time. A roller bearing arrangement according to the invention, i.e., a bearing system combined with a measuring system, can also be directly installed in the motor shaft bearing of, e.g., synchronous and asynchronous motors, for the purpose of electronic commutation, as well as for incremental and absolute angular identification.

In a preferred embodiment of the invention the material measure is formed by sinusoidal cycles, which are preferably formed as sections or recesses, or by a varying distribution of thickness, a varying distribution of masses, or by a coating on one or both of the sensor surfaces. The number of cycles of the material measure determines the basic resolution of the specific measurement. The total resolution can then be determined from the basic resolution multiplied by an interpolated factor per cycle.

In a particularly advantageous embodiment a second material measure is provided on one of the sensor surfaces. If the second material measure represents a 360° structure, the absolute angular position can be determined. This is also possible when the second material measure represents a structure whose number of cycles is such that the ratio of the fine structure to the coarse structure relative to 360° is always unambiguous (e.g., fine structure 16 cycles, coarse structure 3 cycles).

Also possible is an embodiment which provides only the just described second material measure, while the first material measure is omitted. The unambiguous angular assignment of 360° or 120° can then be achieved with a lesser degree accuracy, but one which is entirely sufficient in a few applications.

By combining the material measures, the rotor's position can be clearly identified, and with a high degree of accuracy and resolution.

With further material measures a multi-channel fine adjustment is possible, as is the identification of other bearing vibrations. The material measures should then be graded from coarse to fine.

The bearing arrangement according to the invention assumes the tasks of guiding the material measure, (or the moving sensor elements) and receiving a rotating shaft (or rotating component), while the sensor unit is coupled directly to the bearing. Thus a separate sensor solution for measuring a rotational speed or direction can be omitted in many applications.

It has also proven to be advantageous if the electrostatic field has a varying curve (e.g., phase-displaced) in different segments on the capacitor surface.

In accordance with the invention, the bearing arrangement takes on the task of guiding the material measure, or the moving sensor element, and of receiving a revolving shaft, or a rotating component, while the sensor unit is directly coupled to the bearing. In many applications, this makes it possible to omit a separate sensor arrangement for measuring a rotational speed or direction.

In an advantageous embodiment of the invention the sensor unit is positioned in a separate housing, which is ready for mounting in combination with the roller bearing. Here one of the sensor elements is connected in torque-proof fashion to the revolving bearing component of the roller bearing. In this case, the housing advantageously provides a good electrical insulation for the sensor unit. The stable housing part allows the bearing component to be pre-stressed against the bearing and allows for the axial transfer of force to the bearing. The sensor housing and the material measure can be advantageously separated from the bearing. This may be necessary, e.g., for the purposes of repair or recycling.

In a particularly advantageous embodiment of the invention the sensor unit is directly integrated into the roller bearing. To this end, the sensor elements, with the material measures, can be positioned in the intermediate space between the bearing rings.

The roller bearing advantageously includes a digital absolute value output for position and/or an analog sine/cosine output for measuring the rotational speed.

It is understood that the roller bearing can include other sensors, whose signals are additionally processed by the processing electronics already present. The other sensors can measure, e.g., the temperature, vibration, and/or the operating period of the roller bearing.

Since the measurements provided by the above-described sensor unit may also be dependent on incidental vibrations, these influences can be advantageously filtered out with the suitable evaluation of the measuring signal as an indication of a vibration. Thus additional sensors, e.g., acceleration sensors, can be omitted. In the process, changes in frequency (due, e.g., to damage to the bearing) can be inferred from those changes in capacitance that are phase-independent.

Other examples for the design of the sensor elements and evaluation methods can be seen in DE 600 395 T2, which, to this extent, is included in the present application's area of disclosure.

BRIEF DESCRIPTION OF DRAWINGS

A preferred embodiment of the invention is next described in greater detail on the basis of the figures. Shown are:

FIG. 1: a spatial depiction of a roller bearing, with a capacitive sensor unit

FIG. 2: a longitudinal section according to FIG. 1

DETAILED DESCRIPTION

Figure 3:
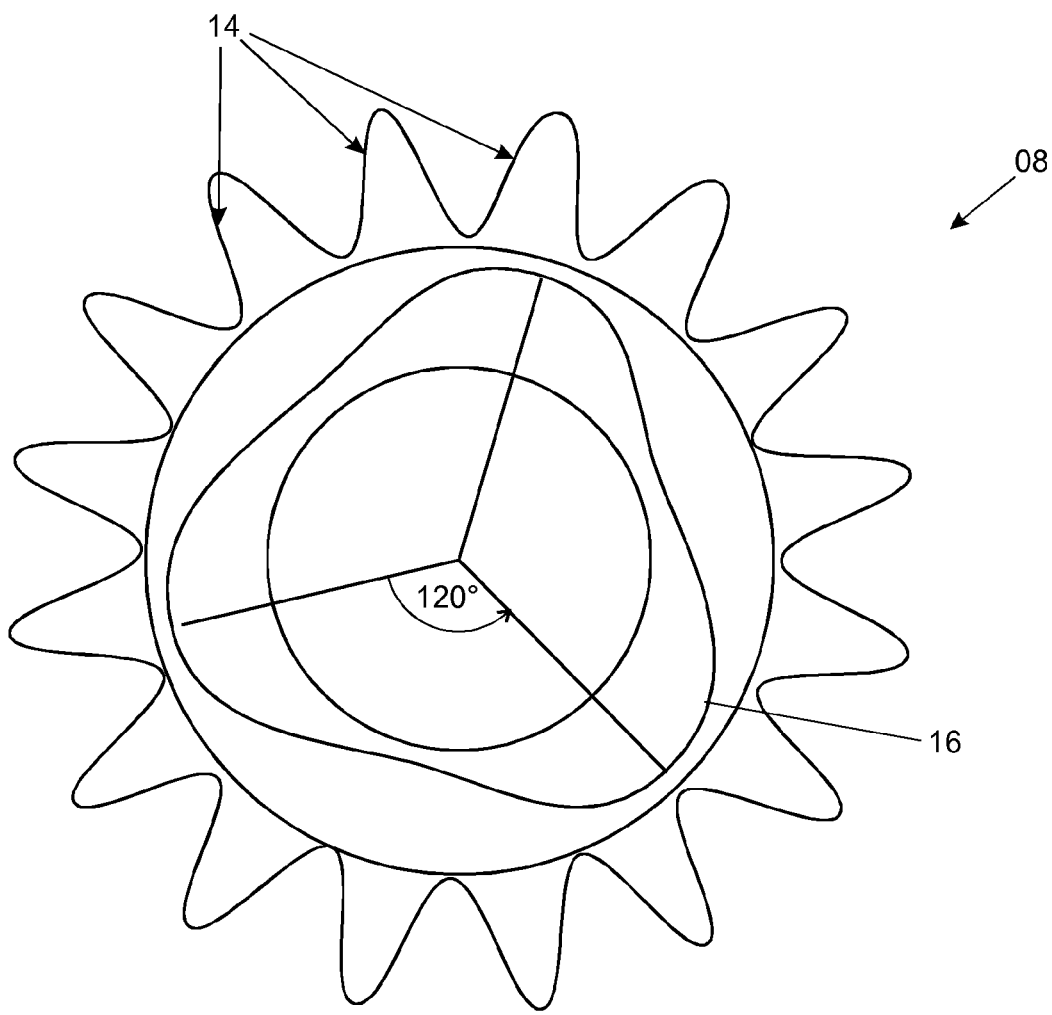
FIG. 3 a material measure of a rotor from a capacitive sensor.

FIG. 1 shows a roller bearing arrangement according to the invention, which combines a roller bearing 01 with a capacitive sensor 02. The sensor unit 02 is connected to a lateral surface of the roller bearing 01 in such a way that it covers said surface almost entirely. By preference, the sensor unit 02 also has a lead-through for the supported shaft (which is not depicted). The connection between the sensor unit and the roller bearing can be made by means of adhesion or by joining the two components in a form-fitting or force-fitting manner. In this embodiment, the form fit occurs at the bearing rings, at the recess provided for the sealing ring (not shown). The outer diameter of the sensor unit 02 is by preference slightly smaller than that of the roller bearing 01. The sensor unit 02 includes an electrical supply device 03, by means of which both said sensor unit 02 is provided with energy and the measured signals are emitted for further processing. The signals can, e.g., be transmitted to a control device over a digital interface.

FIG. 2 provides a longitudinal section of the combination of roller bearing 01 and sensor unit 02 shown in FIG. 1. In a manner known to the prior art, the roller bearing 01 comprises an inner ring 04, an outer ring 04, and roller bodies 06 guided in a cage 07 between them.

The sensor unit 02 comprises a rotor 08 as the first, pivoted sensor element, which is connected in torque-proof fashion to the revolving inner ring 04. A stator 09, as the second sensor element, is connected in torque-proof fashion to a sensor housing 10. The stator 09 has two plates 11, 12 which form a capacitor, whose capacitance is continuously measured in a processing and amplifying electronic component, which by preference is also positioned in the sensor housing 10. At least one of the plates is segment, i.e., is divided into different segments over its circumference.

A conventional sine/cosine signal is formed by modulating the capacitance by means of the angle-dependent overlaying of the segments on one of the plates 11, 12. This serves to identify the position and forms the basis, together with a 120° structure, for an absolute identification of position.

A material measure (see FIG. 3) is provided on the rotor 09. Accuracy in identifying the position is influenced by the design of the material measure.

The design of the sensor elements 08, 09 also makes it possible to detect certain oscillation frequencies, which provide information on the bearing's wear and load.

When the outer ring is a revolving one, the configuration can be adjusted accordingly, and in a simple manner.

By way of example, FIG. 3 shows a top view of the possible design for the rotor 8 as the first sensor element. On its outer circumferential area, the depicted rotor 08 has sixteen sinusoidal cycles 14, so that the rotor 08 has a shape resembling a cog wheel. The first material measure is formed by these cycles, or by their number.

A structure 16 with a material reinforcement can be identified in the inner radial area of the rotor 08. This represents a second material measure, which is formed from three sinusoidal cycles distributed over the circumference, by means of which the structure of (by way of example) 360° (3×120°) is established with sufficient precision.

If several material measures are provided on the rotor, it is preferred that a separate segmentation be provided on the stator for each of the material measures.

The processing and amplification electronics generate an analogue sine/cosine signal for identifying the rotating speed and also by preference a digital signal for the absolute identification of position. In principle, however, any desired signal form can be used for transmitting and evaluating the signals.

The two signal forms are transmitted to an external controller via a measuring system cable. The analogue sine/cosine signal, which is customarily used for position control, can be replaced with a fully digital signal. Transmission to a controller is then possible over a single motor cable, i.e., the measuring system cable can be omitted in the case of applications in a motor.

In other embodiments of the invention, the same sensor area configuration can be used to identify parallel vibrations between the outer and inner ring of the bearing, and to identify the bearing temperature. Arising vibrations also lead to a superimposed change in capacitance, so that a signal that represents the arising vibrations can be obtained by suitable filtering.

LIST OF REFERENCE NUMERALS 01 roller bearing
02 capacitive sensor unit
03 feed device
04 inner ring
05 outer ring
06 roller body
07 cage
08 rotor
09 stator
10 sensor housing
11 plate
12 plate
13 electronics unit
14 sinusoidal cycle, first material measure
15 structure, second material measure

The invention claimed is:

1. Roller bearing comprising a revolving bearing component and a stationary bearing component, and with a sensor unit which is firmly connected to the roller bearing, or directly integrated into the roller bearing,
wherein
the sensor unit comprises:
a first pivoted sensor element, which is connected to the revolving bearing component;
a second, stationary and electrically conductive sensor element which forms a capacitor with at least two capacitor plates;
a means for generating an electrostatic field between the capacitor plates;
a processing and amplifying electronics unit for evaluating the capacitor's change in capacitance,
such that the first sensor element is positioned in the dielectric of the formed capacitor and such that at least one of the sensor elements bears a first material measure, so that a change in the capacitance of the capacitor arises when there is a relative movement between the sensor elements.

2. Roller bearing according to claim 1,
wherein
the first material measure is formed by material recesses, a varying distribution of thickness, a varying distribution of masses, or by a coating on the first sensor element.

3. Roller bearing according to claim 1,
wherein
the first material measure is embodied by a 120° or 360° structure.

4. Roller bearing according to claim 1,
wherein
the second sensor element is formed by two capacitor plates that are arranged in parallel fashion, between which the first sensor element is positioned.

5. Roller bearing according to claim 4,
wherein
one of the plates is segmented, and there is a phase-displaced input of the electrostatic field into the segments of this plate, or a phase-displaced curve for the capacitor change is identified in the segments of this plane.

6. Roller bearing according to claim 1,
wherein
the first sensor element includes a second material measure which by preference is embodied by a 360° structure.

7. Roller bearing according to claim 1,
wherein
at least the first material measure has the shape of sinusoidal cycles.

8. Roller bearing according to claim 1,
wherein
the first material measure is guided through the revolving bearing component, and a shaft or a structural component, whose rotating speed or angle is to be measured, is seated in the revolving bearing component.

9. Roller bearing according to claim 1,
wherein
the roller bearing includes a digital output for the absolute value.

10. Roller bearing according to claim 1,
wherein
the roller bearing includes other sensors, particularly for measuring temperature, vibration, and/or the operating period of the roller bearing, and the signals provided by these sensors are additionally processed by the processing electronics unit.

* * * * *